United States Patent
Byun et al.

(10) Patent No.: US 11,109,298 B2
(45) Date of Patent: Aug. 31, 2021

(54) METHOD AND APPARATUS FOR UPDATING ACB-RELATED PARAMETERS

(71) Applicant: LG Electronics Inc., Seoul (KR)

(72) Inventors: Daewook Byun, Seoul (KR); Jian Xu, Seoul (KR); Sangwon Kim, Seoul (KR); Seokjung Kim, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 44 days.

(21) Appl. No.: 16/631,114

(22) PCT Filed: Jul. 16, 2018

(86) PCT No.: PCT/KR2018/008010
§ 371 (c)(1),
(2) Date: Jan. 14, 2020

(87) PCT Pub. No.: WO2019/013597
PCT Pub. Date: Jan. 17, 2019

(65) Prior Publication Data
US 2020/0275344 A1  Aug. 27, 2020

Related U.S. Application Data

(60) Provisional application No. 62/532,393, filed on Jul. 14, 2017.

(51) Int. Cl.
*H04W 48/02* (2009.01)
*H04W 48/08* (2009.01)
*H04W 74/08* (2009.01)

(52) U.S. Cl.
CPC .......... *H04W 48/02* (2013.01); *H04W 48/08* (2013.01); *H04W 74/0833* (2013.01)

(58) Field of Classification Search
None
See application file for complete search history.

(56) References Cited

U.S. PATENT DOCUMENTS

| 2014/1200938 | 5/2014 | Widell et al. |
| 2020/0162998 A1* | 5/2020 | Zhang ................. H04W 48/10 |

FOREIGN PATENT DOCUMENTS

| EP | 2757832 | 7/2014 |
| WO | WO2016/006980 | 1/2016 |
| WO | WO2017/101042 | 6/2017 |

OTHER PUBLICATIONS

NEC, "How many splits in Function Split options and principles", R3-161708, 3GPP TSG RAN WG3 meeting #93, Göteborg, Sweden, Aug. 22-28, 2016, 4 pages.

* cited by examiner

*Primary Examiner* — Hong S Cho
(74) *Attorney, Agent, or Firm* — Fish & Richardson P.C.

(57) ABSTRACT

Provided are: a method by which a central unit (CU) of a base station updates access control barring (ACB)-related parameters in a wireless communication system; and an apparatus for supporting the same. The method comprises the steps of: receiving information indicating a change in the ACB-related parameters; updating the ACB-related parameters based on the received information; and transmitting the updated ACB-related parameters to a distributed unit (DU) of the base station.

15 Claims, 11 Drawing Sheets

METHOD AND APPARATUS FOR UPDATING ACB-RELATED PARAMETERS

CROSS-REFERENCE TO RELATED APPLICATIONS

This application is a National Stage application under 35 U.S.C. § 371 of International Application No. PCT/KR2018/008010, filed on Jul. 16, 2018, which claims the benefit of U.S. Provisional Application No. 62/532,393 filed on Jul. 14, 2017. The disclosures of the prior applications are incorporated by reference in their entirety.

BACKGROUND OF THE DISCLOSURE

Field of the Disclosure

The present disclosure relates to a wireless communication system and, more particularly, to a method and an apparatus for updating an access class barring (ACB)-related parameter in a scenario where a central unit (CU) and a distributed unit (DU) of a base station are split.

Related Art

In order to meet the demand for wireless data traffic soaring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

SUMMARY OF THE DISCLOSURE

In LTE, an access class barring (ACB) parameter may belong to system information. Likewise, in NR, an ACB parameter may also belong to system information. In a scenario where a CU and a DU are split, when an ACB parameter needs to be changed due to congestion on a radio interface, the CU may not update the ACB parameter, because the CU cannot know the current radio situation. Therefore, it is necessary to propose a procedure for the CU of a base station to update the ACB parameter.

According to one embodiment, there is provided a method for a CU of a base station to update an access class barring (ACB)-related parameter in a wireless communication system. The method may include: receiving information indicating a change in the ACB-related parameter; updating the ACB-related parameter on the basis of the received information; and transmitting the updated ACB-related parameter to a distributed unit (DU) of the base station.

According to another embodiment, there is provided a central unit (CU) of a base station for updating an access class barring (ACB)-related parameter in a wireless communication system. The CU may include: a memory; a transceiver; and a processor to connect the memory and the transceiver, wherein the processor may be configured to: control the transceiver to receive information indicating a change in the ACB-related parameter; update the ACB-related parameter on the basis of the received information; and control the transceiver to transmit the updated ACB-related parameter to a distributed unit (DU) of the base station.

A CU of a base station can change an ACB-related parameter.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a post-4G LTE mobile communication technology and new clean-slate mobile communication system having high performance, a low delay, and high availability. 5G NR may utilize all available spectral resources from a low-frequency band of less than 1 GHz to an intermediate-frequency band of 1 GHz to 10 GHz and a high-frequency (millimeter-wave) band of 24 GHz or higher.

For clarity, the following description will focus on LTE or 5G NR. However, technical features of the present disclosure are not limited thereto.

Figure 1:
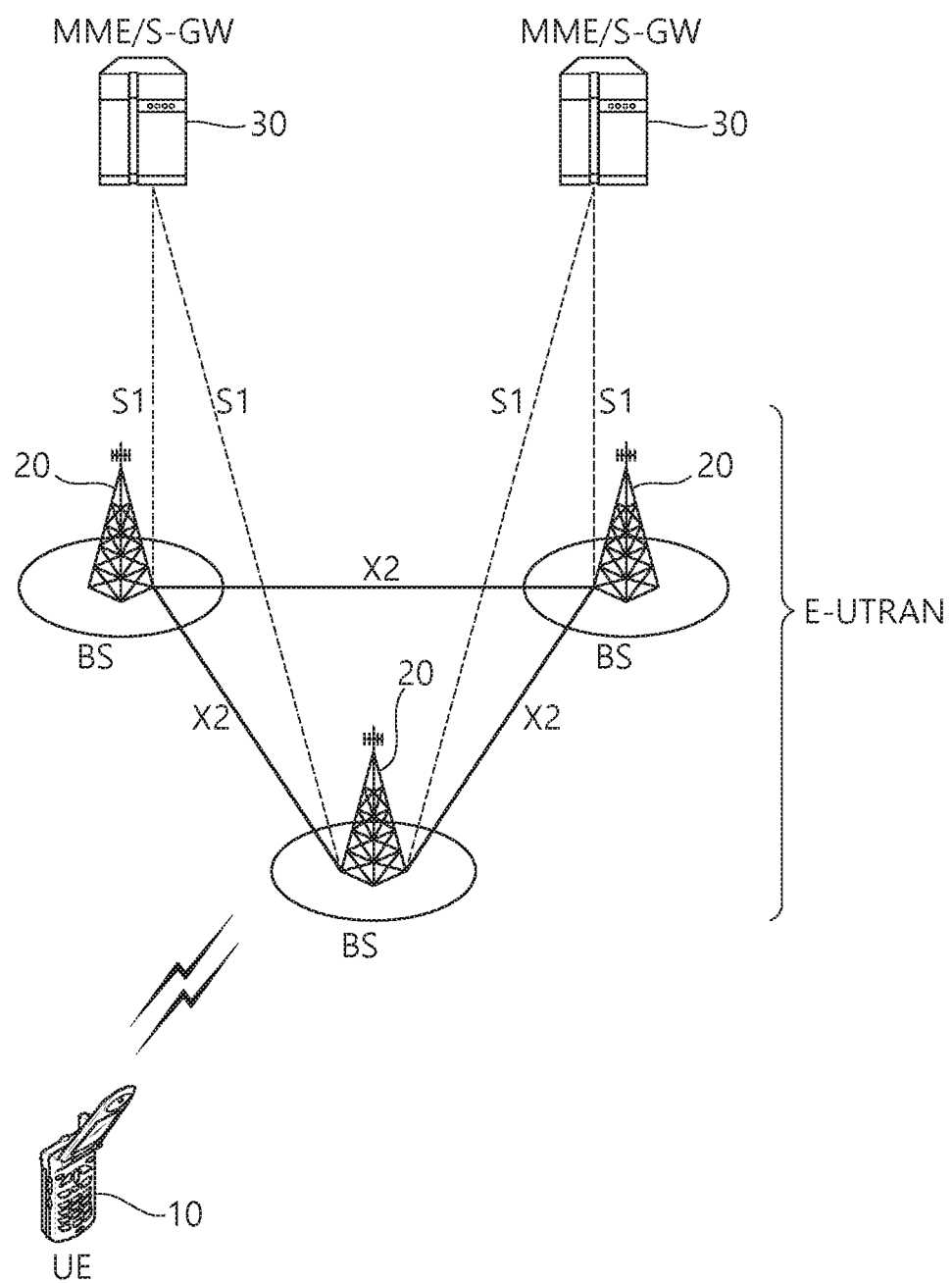
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
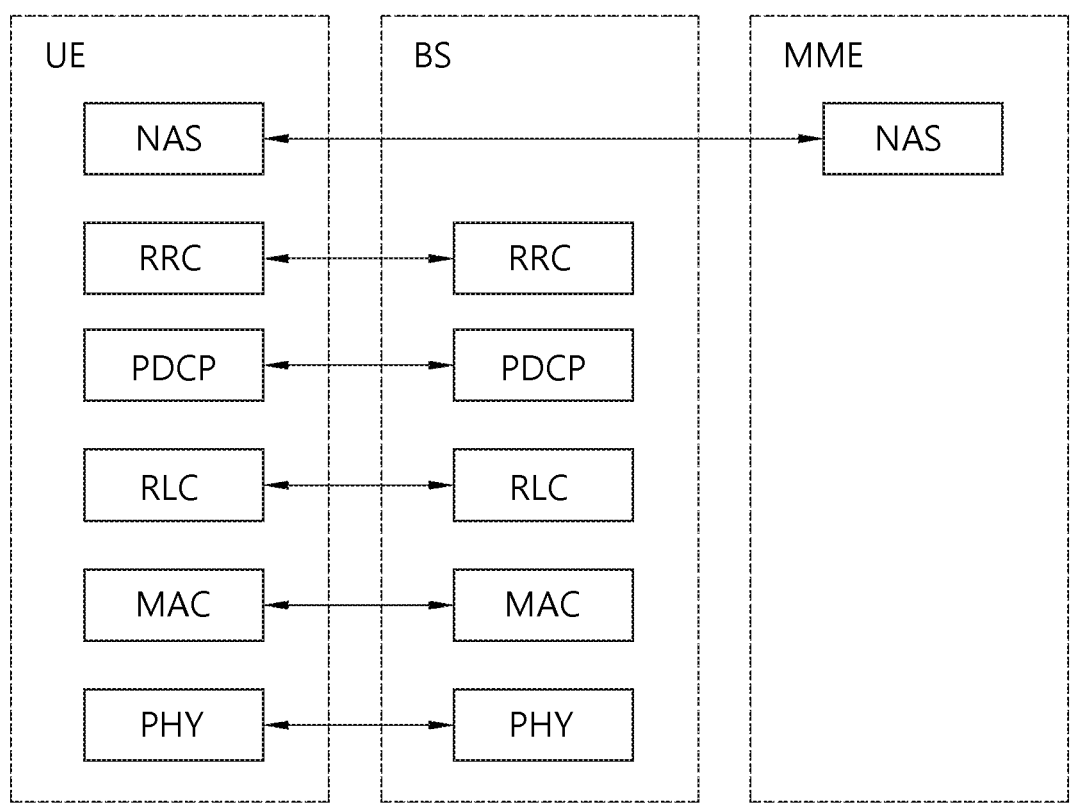
FIG. 2 shows a control plane of a radio interface protocol of an LTE system.
Figure 3:
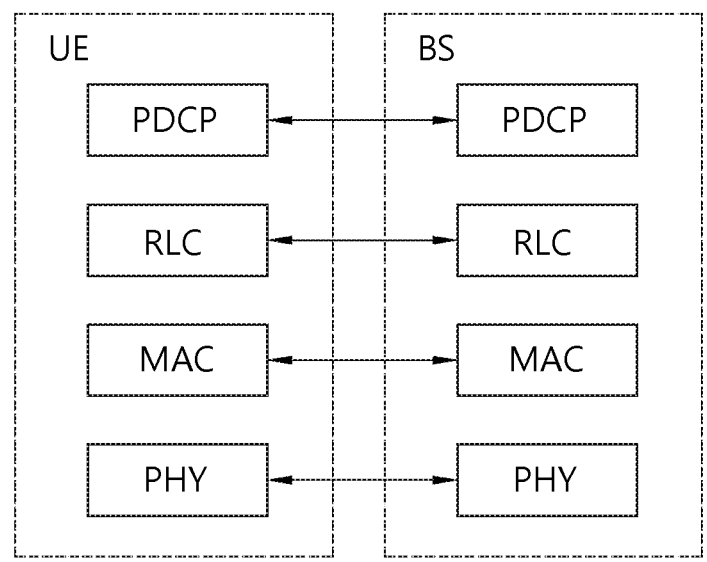
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, Access Class Barring (ACB) Will be Described.

Figure 4:
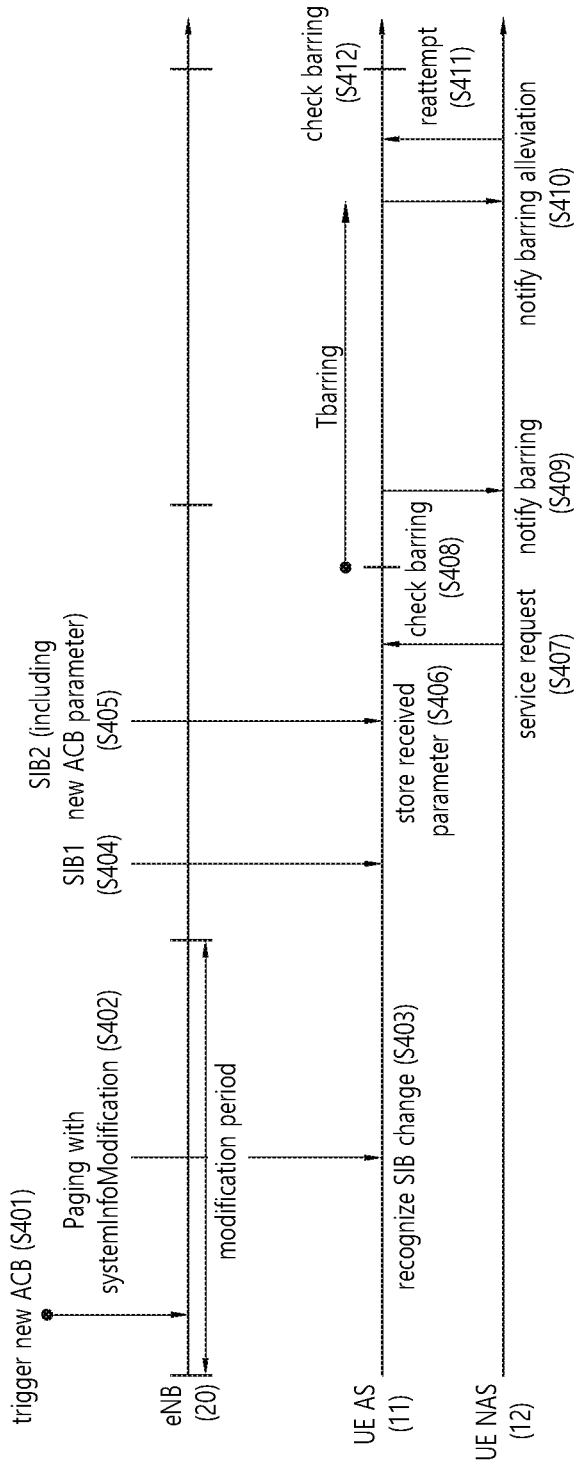
FIG. 4 shows an access class barring (ACB) operation.

FIG. 4 shows an ACB operation.

Referring to FIG. 4, ACB is a technique for controlling access of a UE to control system load, which includes a stage in which an eNB broadcasts barring information to UEs in advance and a stage in which UEs attempt to perform access based on a class that the UEs have and the barring information broadcast by the eNB. When new ACB information is triggered (S401), the eNB may notify an UE AS that SIB (SystemInformationBlock) information is to be changed soon due to the new ACB information, using a systemInfoModification IE of a paging (S402). The UE receiving the paging may recognize that the SIB information to be changed soon (S403). The systemInfoModification IE included in the paging is an indicator indicating that the SIB information is changed, and the indicator may have different forms according to embodiments.

The eNB may notify the UE that the SIB information is to be changed soon through a paging in a modification period before broadcasting changed SIB information. Thereafter, the changed SIB information is broadcast in a next modification period.

After completing the modification period in which the paging is received, the UE receives SIB1 information to receive new SIB information (S404). There are several types of SIBs depending on purposes. SIB1 to SIB14 exist in Rel-11 LTE technology, and SIBs are continuously developed to support new functions of standard technologies. Among different SIBs, SIB1 may include scheduling information on other SIBs. Therefore, SIB1 needs to be received first in order to receive other SIB information.

Subsequently, the UE may receive SIB2 information including ACB information (S405). The UE AS may store the ACB information (S406). A UE NAS may send a service request to the UE AS when a service, that is, communication, is needed (S407). Then, the UE AS may determine whether to allow access based on the stored ACB information (S408). A UE is necessarily assigned a class with a value between 0 and 9. Further, the UE may further be assigned a class having a value of 11 to 15 for a special purpose. In addition, there is class 10 associated with an emergency call. The eNB may restrict access to a particular class. In LTE technology, access to any designated one of classes 0 to 9 may not be restricted, and access to one or more designated classes among classes 11 to 15 for special purposes may be restricted.

Instead, the eNB may provide a barring factor and barring time information with respect to classes 0 to 9. The barring factor may be a value ranging from 0 to 1. The UE selects one random value between 0 and 1 and compares the value with the barring factor. When the value selected by the UE is lower than the barring factor, it may be determined that access is allowed. When the value selected by the UE is higher than the barring factor, access is not allowed and the UE may notify the UE NAS that access is not allowed (S409). When access is not allowed, the UE AS may calculate a Tbarring value using the barring time information and the following equation. The following Equation 1 shows a method of calculating the Tbarring value according to the embodiment. A different Tbarring value may be calculated depending on an embodiment.

$$T\text{barring} = (0.7 + 0.6 \times \text{rand}) \times ac\text{-BarringTime} \quad [\text{Equation 1}]$$

After Tbarring time, the UE AS may notify the UE NAS that it is possible to reattempt access (S410). Here, the UE NAS reattempts to access the UE AS (S411), and the UE AS may perform a barring check again (S412). The process described in FIG. 4 may correspond to a general mobile originating (MO) call or signaling, that is, a service request triggered by a UE.

An emergency call triggered by a UE is slightly different from the above process. ACB information for an emergency call differs from an MO call or signaling. That is, acbarringForEmergency information is provided instead of a barring factor or barring time information. The IE may indicate only whether an emergency call is allowed in a Boolean type. When the IE is set to true, the IE indicates that no emergency call is allowed, and access may finally be denied after checking a predetermined additional condition. Also, since no barring time information is provided, there is no stage in which the UE AS notifies the UE NAS whether access is possible after Tbarring.

According to operator policies, a 5G system needs to be able to prevent a UE from accessing a network using a relevant barring parameter that varies depending on an access identity (ID) and an access category. The access ID may be configured in a UE as illustrated in Table 1.

TABLE 1

| Access Identity number | UE configuration |
|---|---|
| 0 | UE is not configured with any parameters from this table |
| 1 | UE is configured for Multimedia Priority Service (MPS). |
| 2 | UE is configured for Mission Critical Service (MCS). |
| 3-10 | Reserved for future use |
| 11 | Access Class 11 is configured in the UE. |
| 12 | Access Class 12 is configured in the UE. |
| 13 | Access Class 13 is configured in the UE. |
| 14 | Access Class 14 is configured in the UE. |
| 15 | Access Class 15 is configured in the UE. |

As listed in Table 2, an access category may be defined as a combination of the type of an access attempt and a condition related to a UE. Access category 0 is not barred regardless of access IDs. The network may control whether to transmit paging, thereby controlling the quantity of access attempts related to access category 0.

TABLE 2

| Access Category number | Conditions related to UE | Type of access attempt |
|---|---|---|
| 0 | All | MO signalling resulting from paging |
| 1 | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8-31 | | Reserved standardized Access Categories |
| 32-63 | All | Based on operator classification |

One or more access IDs and only one access category may be selected, and an access attempt may be tested. The 5G network needs to be able to broadcast barring control information (i.e., a barring parameter list related to an access ID and an access category) in one or more RAN regions. A UE needs to be able to determine whether a particular new access attempts is allowed on the basis of a UE configuration and the received barring control information. For multiple core networks sharing the same RAN, the RAN needs to be able to individually apply access control to the different core networks. A unified access control framework may be applied to both a UE accessing a 5G CN using E-UTRA and a UE accessing the 5G CN using NR.

Hereinafter, a 5G Network Structure is Described.

Figure 5:
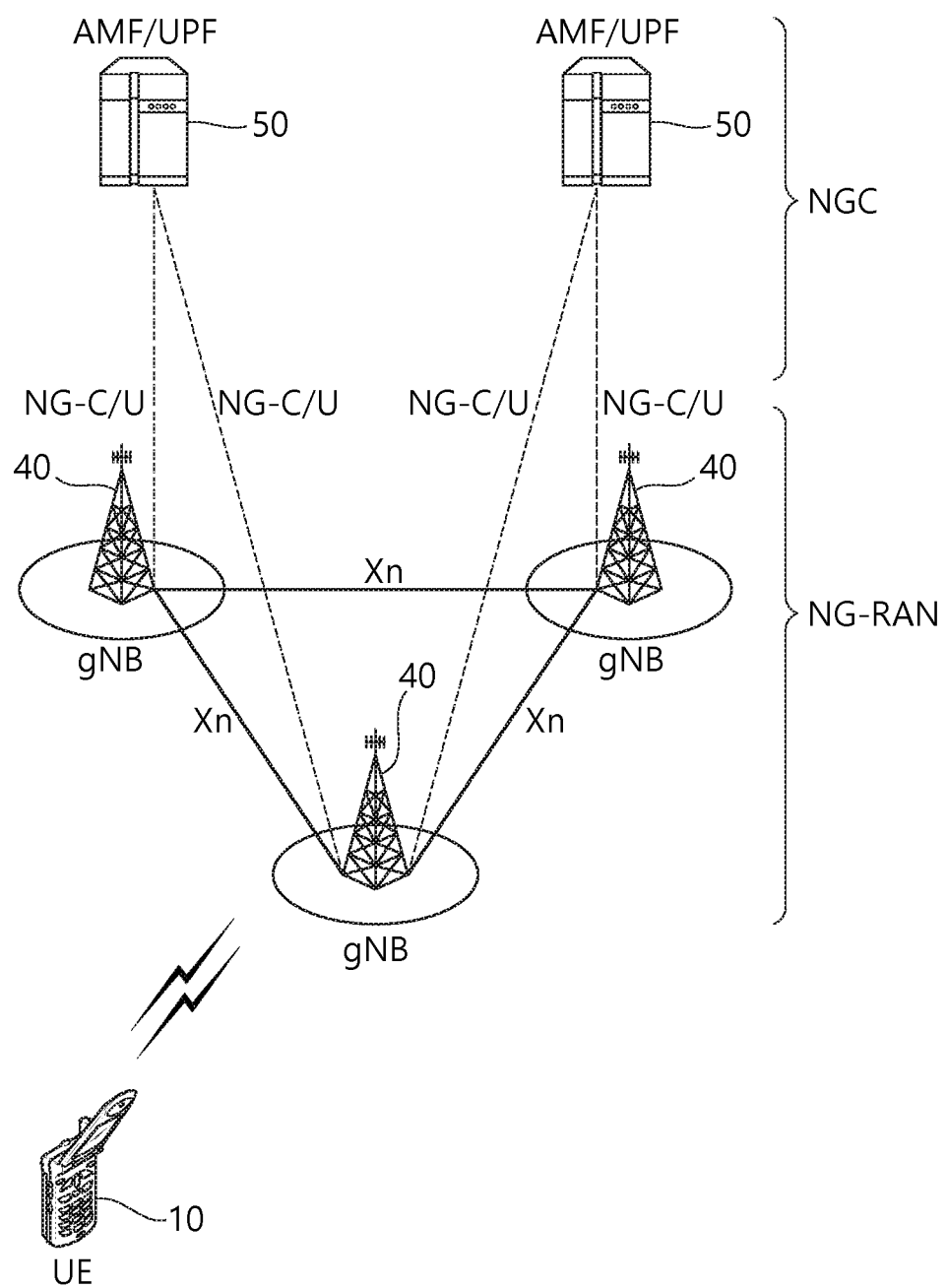
FIG. 5 shows a structure of a 5G system.

FIG. 5 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 5, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NGC interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, a 5G RAN Deployment Scenario Will be Described.

A 5G RAN may be classified into a 'non-centralized deployment' scenario, a 'co-sited deployment with E-UTRA' scenario, and a 'centralized deployment' scenario according to a shape of deploying a function of a BS in a central unit and a distributed unit and according to whether it coexists with a 4G BS. In this specification, the 5G RAN, a gNB, a next generation node B, a new RAN, and a new radio BS (NR BS) may imply a newly defined BS for 5G.

Figure 6:
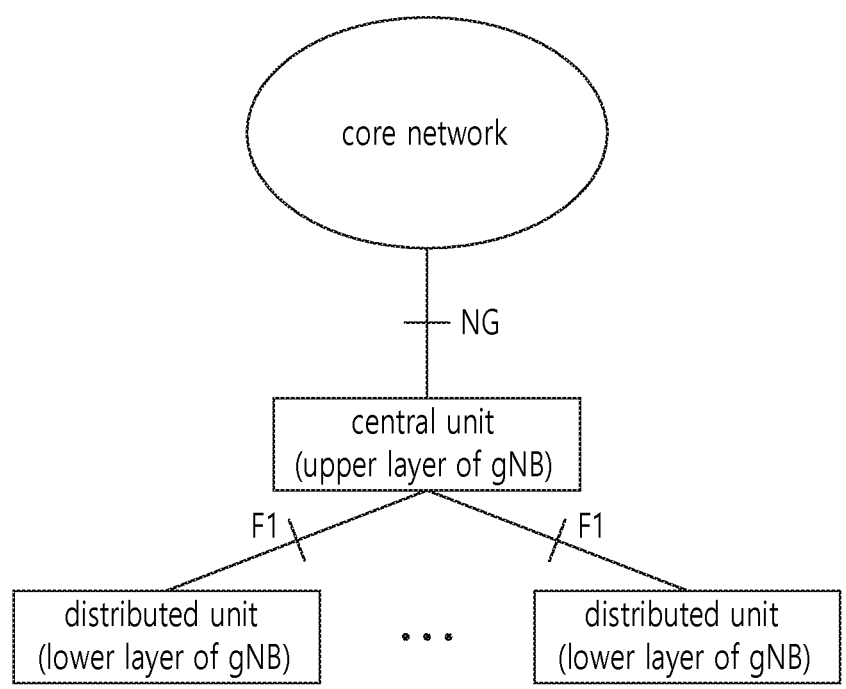
FIG. 6 shows a split-type gNB deployment (centralized deployment) scenario.

FIG. 6 shows a split-type gNB deployment (centralized deployment) scenario.

Referring to FIG. 6, a gNB may be split into a central unit and a distributed unit. That is, the gNB may be operated by being split in a layered manner. The central unit may perform a function of upper layers of the gNB, and the distributed unit may perform a function of lower layers of the gNB.

Figure 7:
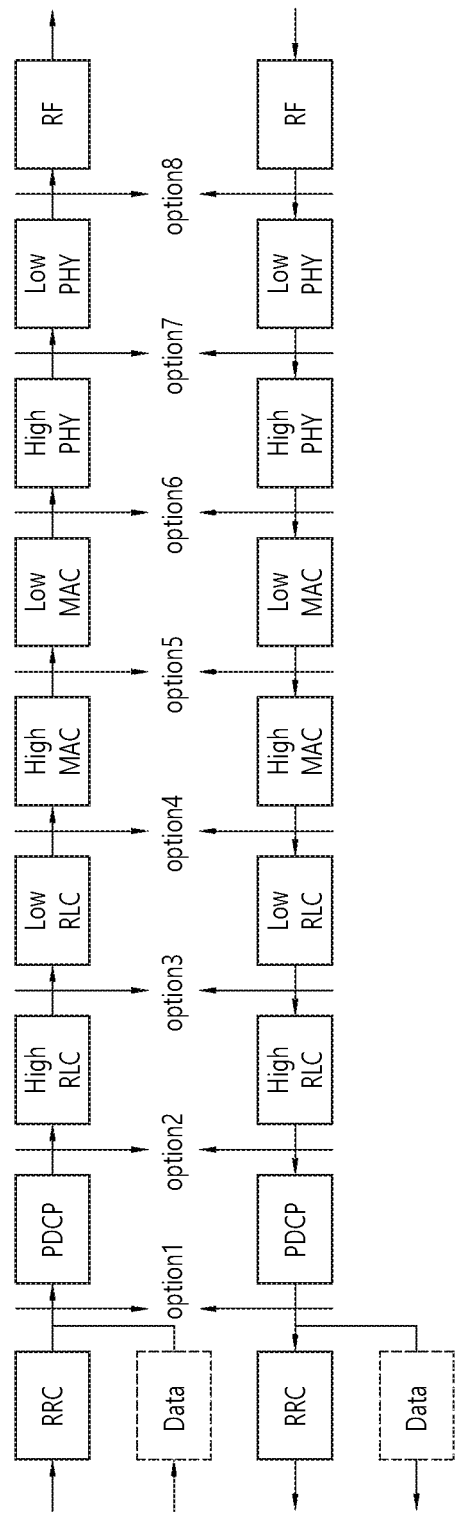
FIG. 7 shows a function split between a central unit and a distributed unit in a split-type gNB deployment scenario.

FIG. 7 shows a function split between a central unit and a distributed unit in a split-type gNB deployment scenario.

Referring to FIG. 7, in case of an option 1, an RRC layer is in a central unit, and an RLC layer, a MAC layer, a physical layer, and an RF are in a distributed unit. In case of an option 2, the RRC layer and the PDCP layer are in the central unit, and the RLC layer, the MAC layer, the physical layer, and the RF are in the distributed unit. In case of an option 3, the RRC layer, the PDCP layer, and an upper RLC layer are in the central unit, and a lower RLC layer, the MAC layer, the physical layer, and the RF are in the central unit. In case of an option 4, the RRC layer, the PDCP layer, and the RLC layer are in the central unit, and the MAC layer, the physical layer, and the RF are in the distributed unit. In case of an option 5, the RRC layer, the PDCP layer, the RLC layer, and an upper MAC layer are in the central unit, and a lower MAC layer, the physical layer, and the RF are in the distributed unit. In case of an option 6, the RRC layer, the PDCP layer, the RLC layer, and the MAC layer are in the central unit, and the physical layer and the RF are in the distributed unit. In case of an option 7, the RRC layer, the PDCP layer, the RLC layer, the MAC layer, and an upper physical layer are in the central unit, and a lower physical layer and the RF are in the distributed unit. In case of an option 8, the RRC layer, the PDCP layer, the RLC layer, the MAC layer, and the physical layer are in the central unit, and the RF is in the distributed unit.

Hereinafter, the central unit may be referred to as a CU, and the distributed unit may be referred to as a DU in the present specification. The CU may be a logical node which hosts a radio resource control (RRC), service data adaptation protocol (SDAP), and packet data convergence protocol (PDCP) layers of the gNB. The DU may be a logical node which hosts radio link control (RLC), media access control (MAC), and physical (PHY) layers of the gNB. Alternatively, the CU may be a logical node which hosts RRC and PDCP layers of an en-gNB.

In a scenario where a CU and a DU are split, a system information management function has been discussed. Further, discussions have been conducted about where a parameter to be broadcast needs to exist of a CU and a DU. Since a parameter to be broadcasted is modified or generated in an RRC layer, signaling between the CU and the DU may be needed so that the DU broadcasts system information. That is, considering that system information generated or modified in the RRC layer is transmitted to a UE, the system information needs to be transmitted to the UE via the DU.

In LTE, an access class barring (ACB) parameter may belong to system information. Likewise, in NR, an ACB parameter may also belong to system information. In a scenario where a CU and a DU are split, when an ACB parameter needs to be changed due to congestion on a radio interface, the CU may not update the ACB parameter, because the CU cannot know the current radio situation. There is no ACB parameter update procedure in view of the current wireless situation in the current scenario where the CU and the DU are split. Therefore, it is necessary to propose a procedure for the CU of a base station to update the ACB parameter. Hereinafter, a method for a CU of a base station to update an ACB-related parameter and an apparatus supporting the same will be described.

Figure 8:
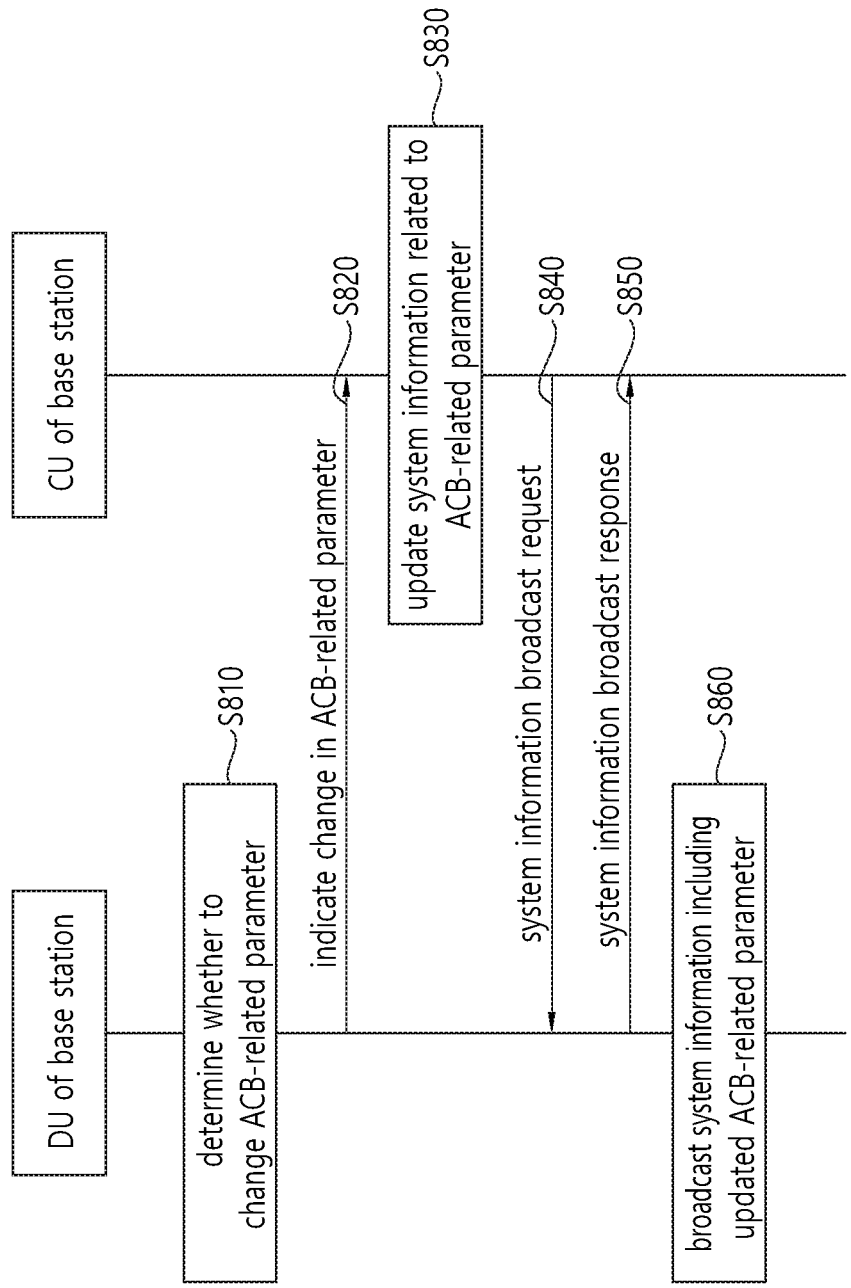
FIG. 8 illustrates an ACB-related parameter update procedure initiated by a DU of a base station according to an embodiment of the present disclosure.

FIG. 8 illustrates an ACB-related parameter update procedure initiated by a DU of a base station according to an embodiment of the present disclosure.

Referring to FIG. 8, in step S810, the DU may determine whether to change an ACB-related parameter. For example, when the DU determines that efficient ACB is not performed with an ACB-related parameter the DU currently has, the DU may determine to change the ACB-related parameters to prevent network congestion. For example, when the DU detects a network congestion situation, the DU may determine to change the ACB-related parameter to prevent network congestion.

For example, the network congestion situation may be a case where the random-access frequency of UEs reaches a specified threshold value. For example, the network congestion situation may be a case where the number of UE attempting random access suddenly increases to a specified level or higher. For example, the network congestion situation may be a case where the quantity of radio resources exceeds a specified level.

The ACB-related parameter may include at least one of a barring factor, a barring time, an access category, and an access identity. For example, the ACB-related parameter may be defined as in Table 3.

TABLE 3

```
uac-BarringInfo              SEQUENCE{
    uac-BarringForCommon            UAC-BarringPerCatList         OPTIONAL,
    uac-BarringPerPLMN-List         UAC-BarringPerPLMN-List       OPTIONAL,
    uac-BarringInfoSetList          UAC-BarringInfoSetList
}
UAC-BarringPerPLMN-List ::=     SEQUENCE (SIZE (1..maxPLMN)) OF UAC-BarringPerPLMN
UAC-BarringPerPLMN ::=          SEQUENCE {
    plmn-IdentityIndex              INTEGER (1..maxPLMN),
    uac-barringPerCatList           UAC-BarringPerCatList
}
UAC-BarringPerCatList ::= SEQUENCE (SIZE (1..maxAccessCat-1)) OF UAC-BarringPerCat
UAC-BarringPerCat ::= SEQUENCE {
    AccessCategory                  INTEGER (1..maxAccessCat-1),
    uac-barringInfoSetIndex         INTEGER (1..maxBarringInfoSet)
}
UAC-BarringInfoSetList ::= SEQUENCE (maxBarringInfoSet) OF UAC-BarringInfoSet
UAC-BarringInfoSet ::= SEQUENCE {
    uac-BarringFactor               ENUMERATED {
                                        p00, p05, p10, p15, p20, p25, p30, p40,
                                        p50, p60, p70, p75, p80, p85, p90, p95},
    uac-BarringTime                 ENUMERATED {s4, s8, s16, s32, s64, s128, s256, s512},
    uac-BarringForAccessIdentity    BIT STRING (SIZE(7))
}
```

Referring to Table 3, uac-BarringForCommon may be a common access control parameter for each access category. The common access control parameter may be used for all PLMNs as long as not being overwritten by a PLMN-specific configuration provided by uac-BarringPerPLMN-List. uac-BarringPerPLMN-List may be an access control parameter for each access category that is valid only for a particular PLMN.

UAC-BarringPerCat may include an access category and uac-barringInfoSetIndex. uac-barringInfoSetIndex may be the index of an entry of a uac-BarringInfoSetList field. For example, value 1 may correspond to a first entry of uac-BarringInfoSetList, and value 2 may correspond to a second entry of uac-BarringInfoSetList. Therefore, a UE receiving uac-barringInfoSetIndex may know which UAC-BarringInfoSet to apply to a particular access category.

uac-BarringInfoSetList may be a list of access control parameter sets. Each UAC-BarringInfoSet may include uac-BarringFactor as an access barring probability value, uac-BarringTime as an access barring time value, and uac-BarringForAccessIdentity. Each access category may be configured with an access parameter corresponding to a particular set. uac-BarringForAccessIdentity may indicate whether an access attempt is allowed with respect to each access identity. The leftmost bit may correspond to access identity 1, and the next bit may corresponding to access identity 2. Value 0 may indicate that an access attempt corresponding to an access identity is allowed.

In step S820, the DU may transmit a message including an indication as to a change in the ACB-related parameter to a CU. That is, the DU may transmit information indicating a change in the ACB-related parameter to the CU so that the CU can update the ACB-related parameter. The message may be an SI modification request message, a UE context modification request message, or a new message.

The indication or the information may include at least one of raw data and a candidate ACB-related parameter. The raw data may be information used by the CU to determine which ACB-related parameter needs to be modified. For example, the raw data may be the number of random accesses simultaneously attempted. For example, the raw data may be the number of random accesses attempted during a specified time interval. For example, the raw data may be the number of UEs in a cell. The raw data may be the quantity of radio resources being used. When the DU can interpret an ACB-related parameter, the candidate ACB-related parameter may be transmitted from the DU to the CU. For example, the DU may determine one or more candidate ACB-related parameters based on the current radio resource situation and may transmit the one or more candidate ACB-related parameters to the CU.

In step S830, when the CU receives the message from the DU, the CU may update the ACB-related parameter on the basis of the received message. The CU may update the ACB-related parameter in consideration of the raw data or the candidate ACB-related parameter received from the DU. For example, when the CU receives the indication as to the change in the ACB-related parameter from the DU, the CU may update the ACB-related parameter in Table 3 on the basis of the indication.

In step S840, the CU may transmit a message providing system information including the updated or changed ACB-related parameter to the DU. The message may be a system information (SI) broadcast request message, a UE context modification confirm message, or a new message. The message may include at least one of a system information block (SIB) ID for an updated SIB, system information, timing information for broadcasting, logical channel-related information, and broadcast activation.

The updated SIB may include system information and information necessary for the DU to broadcast the system information. A container may be used to transmit the system information including the updated ACB-related parameter from the CU to the DU. The timing information for broadcasting may be information or time for assisting scheduling for the DU to broadcast the system information. For example, the timing information for broadcasting may include at least one of the length of a window in which the system information is broadcast, the number of times the system information is broadcast, and a position in the window when the system information is broadcast. For each parameter in the SIB, timing information for broadcasting may be for each parameter and may have a different value. The logical channel-related information may include logical channel information indicating a logical channel for transmitting the system information. For example, the logical channel information may be a logical channel ID. The broadcast activation may indicate whether the provided system information is broadcast. The broadcast activation may be configured when the system information is always broadcast or requested by a UE.

In step S850, upon receiving the message from the CU, the DU may replace previously provided information about the SIB with the received one. That is, the DU may replace the previous SIB with the updated SIB. The DU may transmit a message including the SIB ID of the updated SIB to the CU. The message may be an SI broadcast response message or a new message.

In operation S860, the DU may broadcast system information including the updated ACB-related parameter on the basis of the information received in operation S840. For example, after the DU transmits the message to the CU in step S850, when the broadcast activation included in the message received from the CU in step S840 is configured, the DU may broadcast system information including the updated ACB-related parameter.

According to the embodiment of the present disclosure, when the DU detects a network congestion situation, the DU may transmit an indication as to a change in an ACB-related parameter (e.g., an access barring factor, an access barring time, or access barring for a special access class) to the CU in order to allow the CU to control an access attempt from a UE through a radio interface. Therefore, the CU may control access attempts from UEs through a radio access on the basis of assistance of the DU in order to prevent a network congestion situation.

Figure 9:
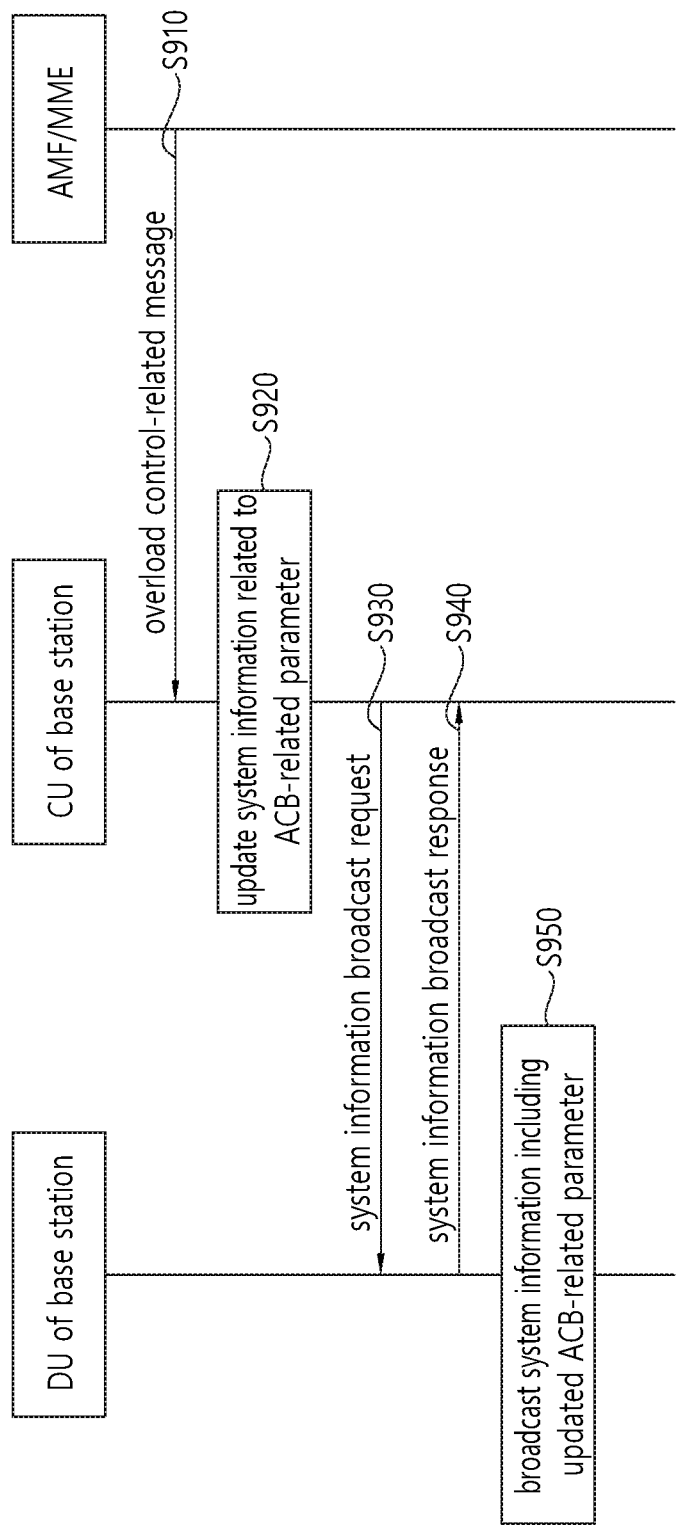
FIG. 9 illustrates an ACB-related parameter update procedure initiated by a core network according to an embodiment of the present disclosure.

FIG. 9 illustrates an ACB-related parameter update procedure initiated by a core network according to an embodiment of the present disclosure.

Referring to FIG. 9, in step S910, the core network may determine whether to change an ACB-related parameter. For example, the core network may be an MME. For example, the core network may be AMF. For example, when the core network determines that efficient ACB is not performed with an ACB-related parameter a CU or a DU currently has, the core network may determine to change the ACB-related parameters to prevent network congestion. For example, when the core network detects a network congestion situation, the core network may determine to change the ACB-related parameter to prevent network congestion.

The core network may transmit a message related to the overload control of an NG interface to the CU. The message may include an indication as to a change in the ACB-related parameter. That is, the core network may transmit information indicating a change in the ACB-related parameter to the CU so that the CU can update the ACB-related parameter. The ACB-related parameter may include at least one of a barring factor, a barring time, an access category, and an access identity. For example, the ACB-related parameter may be defined as in Table 3.

In step S920, when the CU receives the message from the core network, the CU may update the ACB-related parameter on the basis of the received message. For example, when the CU receives the overload control-related message from the core network, the CU may update the ACB-related parameter in Table 3 on the basis of the overload control-related message.

In step S930, the CU may transmit a message providing system information including the updated or changed ACB-related parameter to the DU. The message may be an SI broadcast request message or a new message. The message may include at least one of a system information block (SIB) ID for an updated SIB, system information, timing information for broadcasting, logical channel-related information, and broadcast activation.

The updated SIB may include system information and information necessary for the DU to broadcast the system information. A container may be used to transmit the system information including the updated ACB-related parameter from the CU to the DU. The timing information for broadcasting may be information or time for assisting scheduling for the DU to broadcast the system information. For example, the timing information for broadcasting may include at least one of the length of a window in which the system information is broadcast, the number of times the system information is broadcast, and a position in the window when the system information is broadcast. For each parameter in the SIB, timing information for broadcasting may be for each parameter and may have a different value. The logical channel-related information may include logical channel information indicating a logical channel for transmitting the system information. For example, the logical channel information may be a logical channel ID. The broadcast activation may indicate whether the provided system information is broadcast. The broadcast activation may be configured when the system information is always broadcast or requested by a UE.

In step S940, upon receiving the message from the CU, the DU may replace previously provided information about the SIB with the received one. That is, the DU may replace the previous SIB with the updated SIB. The DU may transmit a message including the SIB ID of the updated SIB to the CU. The message may be an SI broadcast response message or a new message.

In operation S950, the DU may broadcast system information including the updated ACB-related parameter on the basis of the information received in operation S930. For example, after the DU transmits the message to the CU in step S940, when the broadcast activation included in the message received from the CU in step S930 is configured, the DU may broadcast system information including the updated ACB-related parameter.

According to the embodiment of the present disclosure, when the core network detects a network congestion situation, the core network may transmit an overload control-related message for a change in an ACB-related parameter (e.g., an access barring factor, an access barring time, or access barring for a special access class) to the CU in order to allow the CU to control an access attempt from a UE through a radio interface. Therefore, the CU may control access attempts from UEs through a radio access on the basis of assistance of the core network in order to prevent a network congestion situation.

Figure 10:
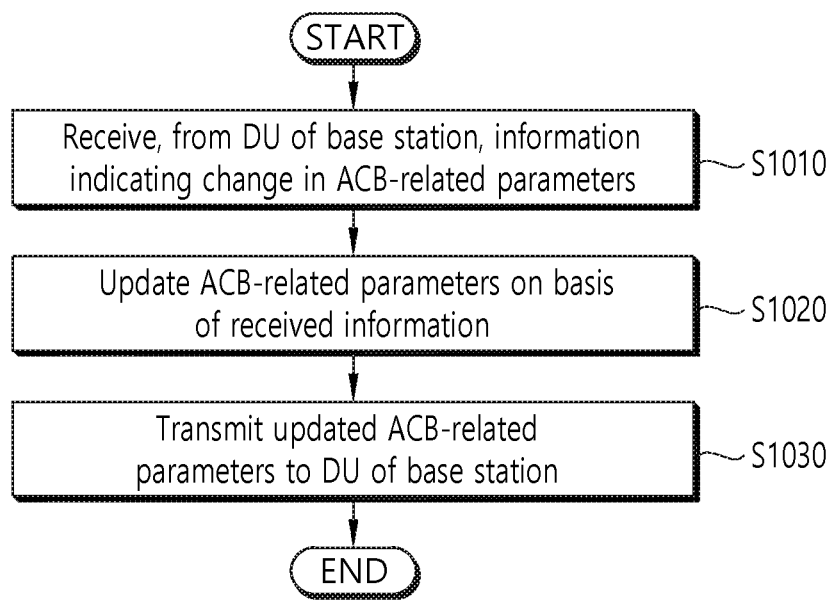
FIG. 10 is a block diagram illustrating a method for a CU of a base station to update an ACB-related parameter according to an embodiment of the present disclosure.

FIG. 10 is a block diagram illustrating a method for a CU of a base station to update an ACB-related parameter according to an embodiment of the present disclosure.

Referring to FIG. 10, in step S1010, the CU of the base station may receive information indicating a change in an ACB-related parameter.

The information indicating the change in the ACB-related parameter may be received from a DU of the base station. When the quantity of radio resources used by the DU exceeds a threshold value, the information indicating the change in the ACB-related parameter may be received from the DU of the base station. The information indicating the change in the ACB-related parameter may include the quantity of radio resources used by the DU. When the number of UEs attempting random access in the DU exceeds a threshold value, the information indicating the change in the ACB-related parameter may be received from the DU of the base station. The information indicating the change in the ACB-related parameter may include the number of UEs attempting random access in the DU. When the number of random access attempts in the DU during a specified time interval exceeds a threshold value, the information indicating the change in the ACB-related parameter may be received from the DU of the base station. The information indicating the change in the ACB-related parameter may include the number of random access attempts in the DU during the specified time interval. The information indicating the change in the ACB-related parameter may include one or more candidate ACB-related parameters.

Alternatively, the information indicating the change in the ACB-related parameter may be received from the AMF.

The ACB-related parameter may include at least one of a barring factor, a barring time, an access category, and an access identity.

The ACB-related parameter may include may include a list of access barring information sets and access barring information for each access category. Each access barring information set may include a barring factor and a barring time, and the access barring information for each access category may include one or more access categories and an index indicating an access barring information set corresponding to the one or more access categories.

In step S1020, the CU of the base station may update the ACB-related parameter on the basis of the received message.

The CU of the base station may update the ACB-related parameter on the basis of the quantity of radio resources used by the DU. The CU of the base station may update the ACB-related parameter on the basis of the number of UEs attempting random access in the DU. The CU of the base station may update the ACB-related parameter on the basis of the number of random access attempts in the DU during the specified time interval. The CU of the base station may update at least one of the barring factor, the barring time, the access category, and the access identity.

In step S1030, the CU of the base station may transmit the updated ACB-related parameter to the DU of the base station. The updated ACB-related parameter may be included in a system information block updated by the CU of the base station and may be transmitted to the DU of the base station.

Figure 11:
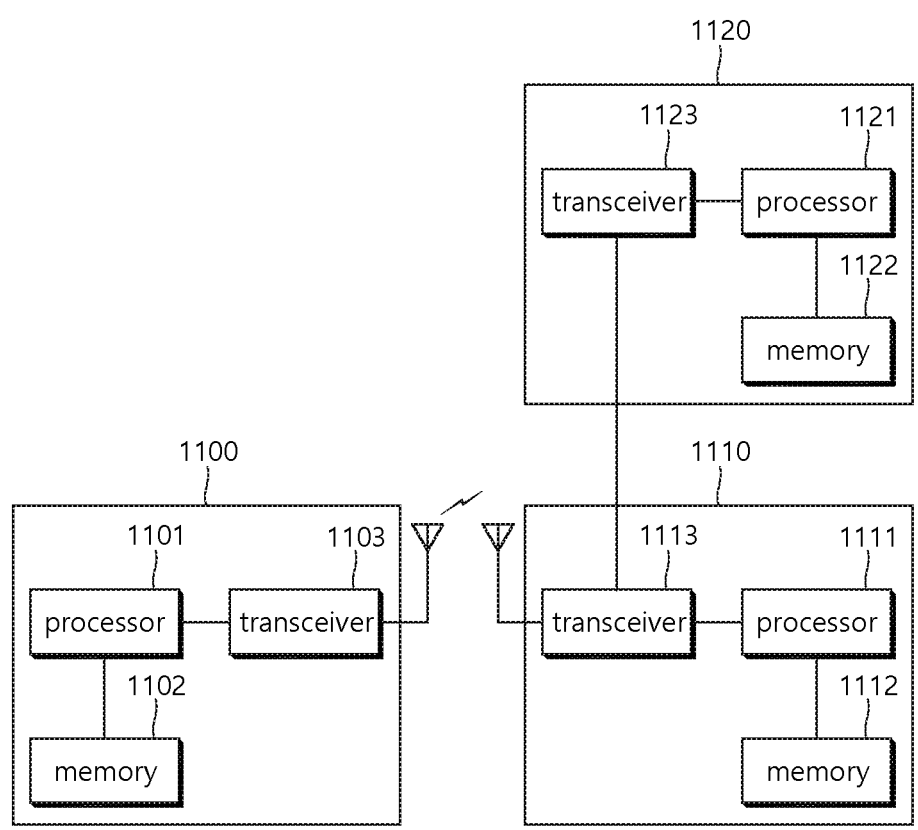
FIG. 11 is a block diagram illustrating a wireless communication system according to the embodiment of the present disclosure.

FIG. 11 is a block diagram illustrating a wireless communication system according to the embodiment of the present disclosure.

A UE 1100 includes a processor 1101, a memory 1102 and a transceiver 1103. The memory 1102 is connected to the processor 1101, and stores various pieces of information for driving the processor 1101. The transceiver 1103 is connected to the processor 1101, and transmits and/or receives radio signals. The processor 1101 implements proposed functions, processes and/or methods. In the above embodiment, an operation of the user equipment may be implemented by the processor 1101.

A DU of a base station 1110 includes a processor 1111, a memory 1112 and a transceiver 1113. The memory 1112 is connected to the processor 1111, and stores various pieces of information for driving the processor 1111. The transceiver 1113 is connected to the processor 1111, and transmits and/or receives radio signals. The processor 1111 implements proposed functions, processes and/or methods. In the above embodiment, an operation of the DU may be implemented by the processor 1111.

A CU of the base station 1120 includes a processor 1112, a memory 1122 and a transceiver 1123. The memory 1122 is connected to the processor 1121, and stores various pieces of information for driving the processor 1121. The transceiver 1123 is connected to the processor 1121, and transmits and/or receives radio signals. The processor 1121 implements proposed functions, processes and/or methods. In the above embodiment, an operation of the CU may be implemented by the processor 1121.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the disclosure disclosed in the claims is not limited to the order of the steps or blocks, and each step or block can be implemented in a different order, or can be performed simultaneously with other steps or blocks. In addition, those ordinarily skilled in the art can know that the disclosure is not limited to each of the steps or blocks, and at least one different step can be added or deleted without departing from the scope and spirit of the disclosure.

The aforementioned embodiment includes various examples. It should be noted that those ordinarily skilled in the art know that all possible combinations of examples cannot be explained, and also know that various combinations can be derived from the technique of the present specification. Therefore, the protection scope of the disclosure should be determined by combining various examples described in the detailed explanation, without departing from the scope of the following claims.

What is claimed is:

1. A method for a central unit (CU) of a base station to update an access class barring (ACB)-related parameter in a wireless communication system, the method comprising:

receiving information indicating a change in the ACB-related parameter;

updating the ACB-related parameter based on the received information; and transmitting the updated ACB-related parameter to a distributed unit (DU) of the base station.

2. The method of claim 1, wherein the information indicating the change in the ACB-related parameter is received from the DU of the base station.

3. The method of claim 2, wherein when a quantity of radio resources used by the DU exceeds a threshold value, the information indicating the change in the ACB-related parameter is received from the DU of the base station.

4. The method of claim 3, wherein the information indicating the change in the ACB-related parameter comprises the quantity of radio resources used by the DU.

5. The method of claim 2, wherein when a number of UEs attempting random access in the DU exceeds a threshold value, the information indicating the change in the ACB-related parameter is received from the DU of the base station.

6. The method of claim 5, wherein the information indicating the change in the ACB-related parameter comprises the number of UEs attempting random access in the DU.

7. The method of claim 2, wherein when a number of random access attempts in the DU during a specified time interval exceeds a threshold value, the information indicating the change in the ACB-related parameter is received from the DU of the base station.

8. The method of claim 7, wherein the information indicating the change in the ACB-related parameter comprises the number of random access attempts in the DU during the specified time interval.

9. The method of claim 2, wherein the information indicating the change in the ACB-related parameter comprises one or more candidate ACB-related parameters.

10. The method of claim 1, wherein the information indicating the change in the ACB-related parameter is received from an access and mobility function (AMF).

11. The method of claim 1, wherein the ACB-related parameter comprises at least one of a barring factor, a barring time, an access category, and an access identity.

12. The method of claim 1, wherein the ACB-related parameter comprises a list of access barring information sets and access barring information for each access category.

13. The method of claim 12, wherein each access barring information set comprises a barring factor and a barring time, and the access barring information for each access category comprises one or more access categories and an index indicating an access barring information set corresponding to the one or more access categories.

14. The method of claim 1, wherein the updated ACB-related parameter is comprised in a system information block updated by the CU of the base station and is transmitted to the DU of the base station.

15. A central unit (CU) of a base station for updating an access class barring (ACB)-related parameter in a wireless communication system, the CU comprising:

a memory;

a transceiver; and a processor to connect the memory and the transceiver, wherein the processor may be configured to:

control the transceiver to receive information indicating a change in the ACB-related parameter;

update the ACB-related parameter based on the received information; and control the transceiver to transmit the updated ACB-related parameter to a distributed unit (DU) of the base station.

\* \* \* \* \*